W. H. BANZETT.
MACHINE FOR MAKING WINDOW ENVELOPS.
APPLICATION FILED APR. 19, 1916.
1,265,987.
Patented May 14, 1918.
4 SHEETS—SHEET 1.
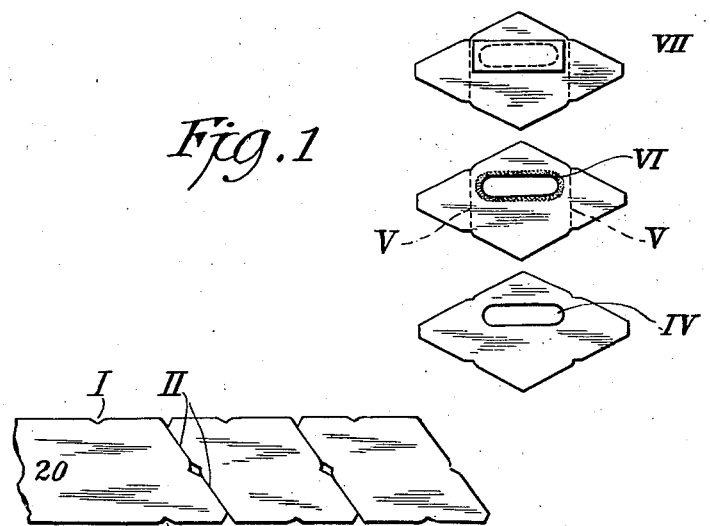
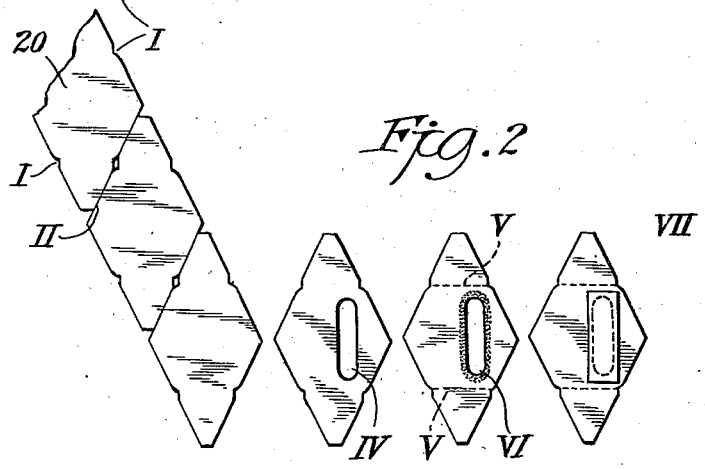
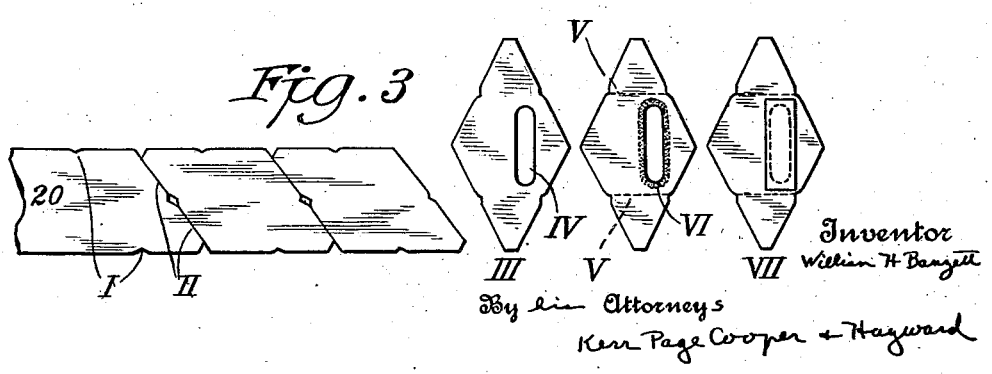

W. H. BANZETT.
MACHINE FOR MAKING WINDOW ENVELOPS.
APPLICATION FILED APR. 19, 1916.

1,265,987.

Patented May 14, 1918.
4 SHEETS—SHEET 2.

Inventor
William H. Banzett
By his Attorneys
Kerr Page Cooper + Hayward

W. H. BANZETT.
MACHINE FOR MAKING WINDOW ENVELOPS.
APPLICATION FILED APR. 19, 1916.
1,265,987.
Patented May 14, 1918.
4 SHEETS—SHEET 3.
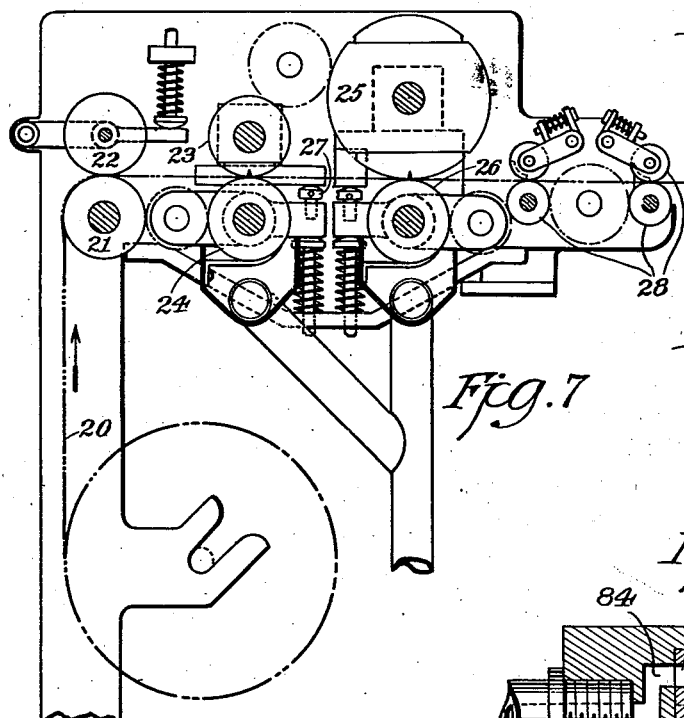
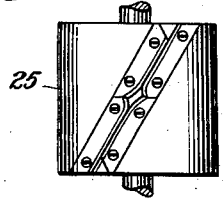
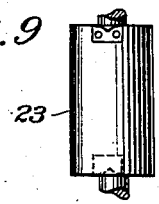
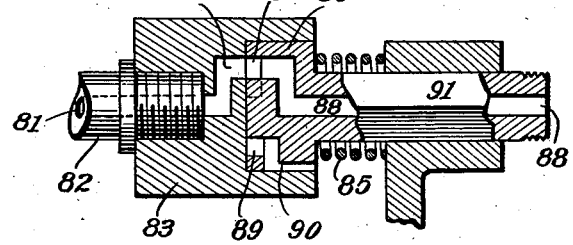
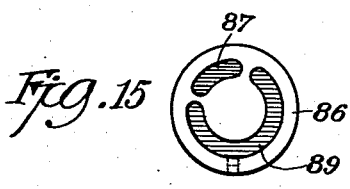
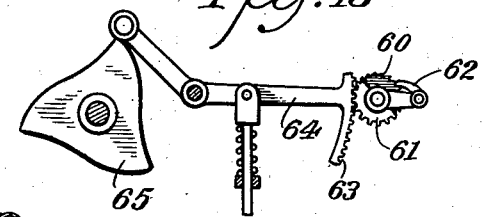
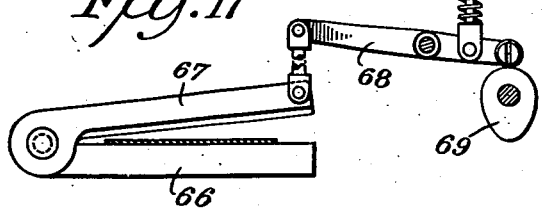
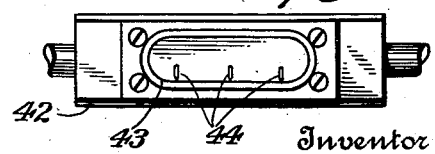
Inventor
William H Banzett
By his Attorneys
Kerr Page Cooper & Hayward

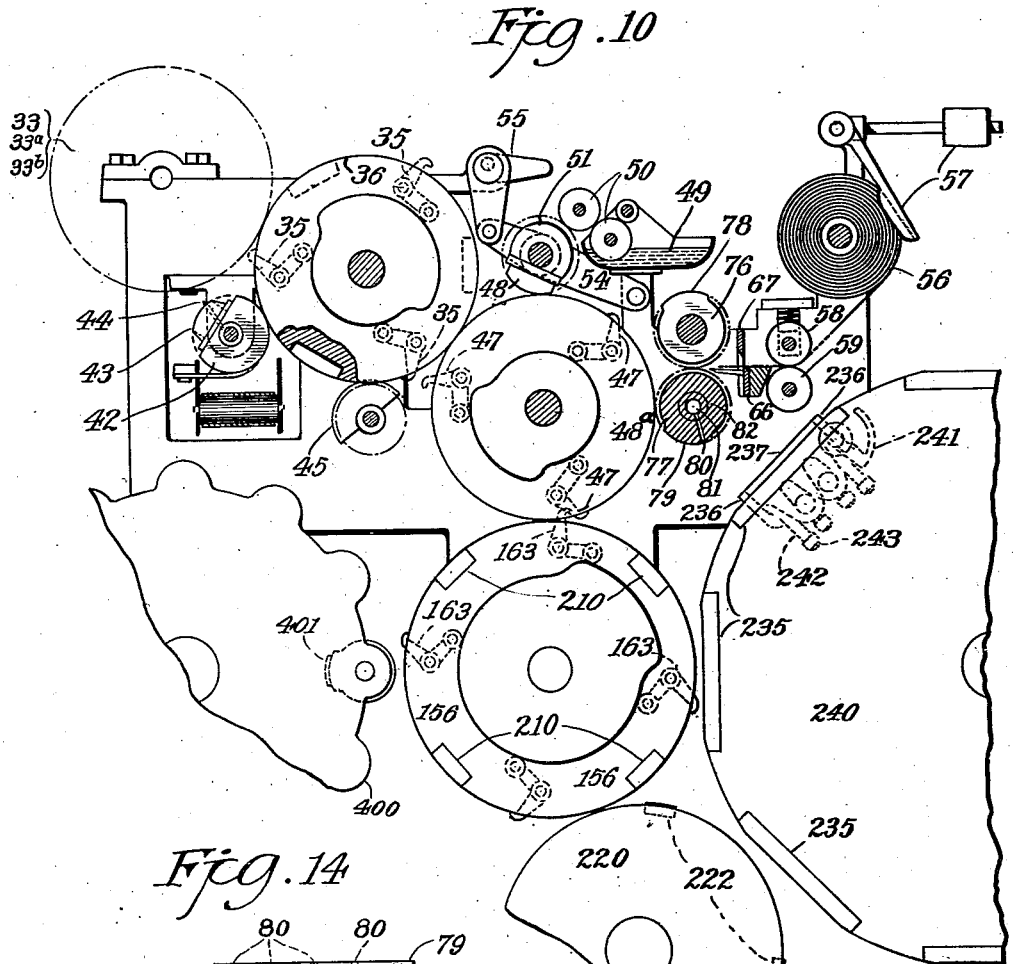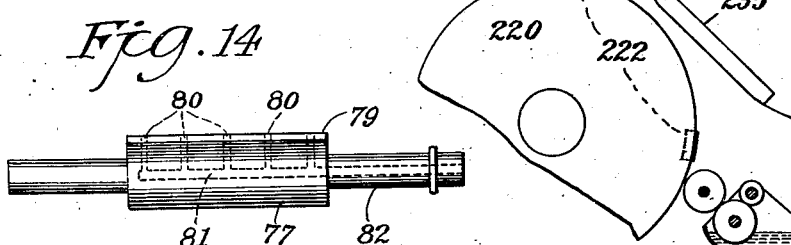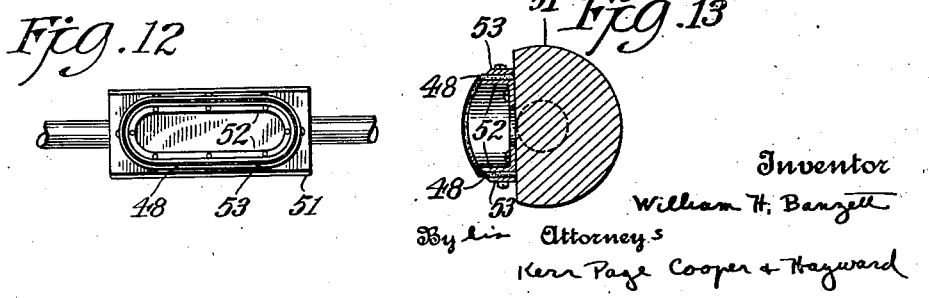

UNITED STATES PATENT OFFICE.

WILLIAM H. BANZETT, OF BERGENFIELD, NEW JERSEY, ASSIGNOR TO MERCANTILE CORPORATION, OF DAYTON, OHIO, A CORPORATION OF NEW YORK.

MACHINE FOR MAKING WINDOW-ENVELOPS.

1,265,987.  Specification of Letters Patent.  Patented May 14, 1918.

Application filed April 19, 1916. Serial No. 92,088.

*To all whom it may concern:*

Be it known that I, WILLIAM H. BANZETT, a citizen of the United States, residing at Bergenfield, in the county of Bergen and State of New Jersey, have invented certain new and useful Improvements in Machines for Making Window-Envelops, of which the following is a full, clear, and exact description.

This invention relates to certain new and useful improvements in machines for producing completed window envelops from a continuous paper web.

The objects of the invention reside in the provision of a machine which takes envelop material in the form of a web of paper, then cuts the web into rhomb shaped blanks, thereby forming blanks with minimum paper waste and a minimum cost; then delivering the blank with the major axis perpendicular to its line of travel, then cutting a window aperture in the blank, then gumming the blank around the edges of said window and applying a patch supplied from a roll of transparent paper over the window apertures; then delivering the blank to envelop folding, printing and embossing mechanism. Other improvements are more particularly pointed out in the accompanying specification, shown in the drawings and defined in the appended claims.

In the drawings

Figures 1, 2 and 3 show in diagrammatic views the operations of cutting, delivering with the major axis perpendicular to the line of travel, window cutting, gumming, and patch applying which are performed in this machine. The different figures show modified methods of delivering the blanks from the cutters to the subsequent devices.

Fig. 7 shows a side view of the web feeding and rhomb shaped blank cutting devices.

Figs. 8 and 9 are detail views of the cutters used to sever the web and form rhomb shaped envelop blanks.

Fig. 10 is a side view of the window cutting gumming and patch applying devices, together with certain parts of the envelop folding and printing mechanism.

Fig. 11 is a detail view of the window aperture cutter.

Figs. 12 and 13 are detail views of the gummer for the margins of the windows.

Fig. 14 is a detail view of one of the patch transfer devices.

Figs. 15 and 16 are detail views of the air valve therefor.

Fig. 17 is a detail view of the knife for severing the patch material, together with the operating devices therefor.

Fig. 18 is a detail view of the devices for feeding forward lengths of patch paper from the supply roll.

Figure 4:
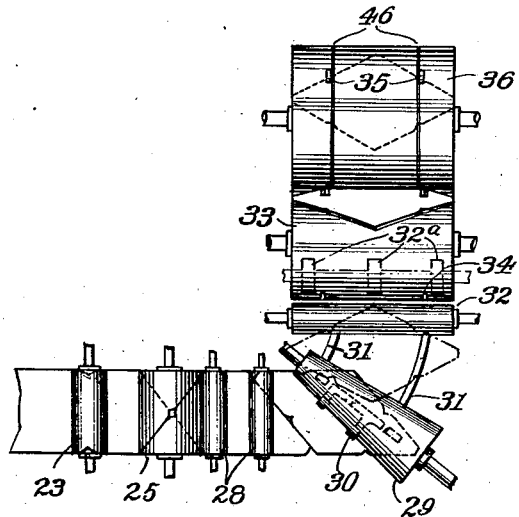
Fig. 4 shows the devices for delivering the blanks at a right angle from the line of the web and with their major axes perpendicular to their subsequent direction of travel. This view corresponds with Fig. 1 of the diagrammatic view.

In more detail in the drawings, the web of paper 20 advances from the parent roll and passes between web feeding rolls 21 and 22. The upper of these rolls is mounted upon a crank arm and is spring pressed downward. The rolls 21 and 22 advance the paper web to the rotary cutter and coacting rotary die rolls 23, 24. The rotary cutter roll 23 is shown in plan in Fig. 9 and this cutter is adapted to cut the wing cuts I in the web as shown in Figs. 1, 2 and 3. The die roll 24 is spring pressed toward the cutting roll and its closeness of approach can be limited to any degree by adjusting nut 27. The die roll carries a chip removing pin. The chip is removed from the pin by a stripper and dropped into a box from which it is removed by air suction in the usual manner. After leaving the cutter 23, the web passes between rotary cutter 25 and coacting rotary die roll 26. These rolls coöperate in a similar manner to cutter and die rolls 23 and 24, and are provided with similar chip removing devices. Cutter 25 is shown in detail in Fig. 8 and this figure shows how the cutter is adapted to sever the web as shown at II in Figs. 1, 2 and 3 and form rhomb shaped envelop blanks, having their sides parallel with the path of the web and with their major axis at an angle to the side of the web. After leaving the severing cutter the blanks advance through propeller rolls 28.

By referring to Figs. 1, 2 and 3, it will be seen that the blanks leaving the cutter are disposed with their major axis at an angle to the side of the web, and at an angle to their line of travel. In performing the subsequent operations on the blanks it is very desirable that the major axes of the blanks be disposed perpendicular to their line of travel through the various mechanisms which perform the different operations.

To effect this change in position or direction of travel, various instrumentalities may be used. Fig. 1 illustrates one method and Fig. 4 the corresponding apparatus. The blanks are fed forward from cutters 23, 25 through propeller rolls 28 which deliver the blanks to a cone device 29 which has blank engaging webs 30 thereon. The cone device as it rotates is adapted to advance and twist the blanks and deliver them through guides 31 to propeller rolls 32. These rolls receive the blanks with the minor axes thereof perpendicular to the side of the web from which they have been cut and advance the blanks with the major axes normal to their subsequent direction of travel as shown by the dotted blank in Fig 4.

It will be understood that right hand roll 28 and propeller roll 32 are relieved, so that these rolls release and grip the blanks in harmony with the gripping and releasing of the blanks by the cone device.

The blanks pass from rolls 32 through propeller rolls 32ª and are delivered to suitable cam operated grippers 34 on second transfer cylinder 33. It will be understood that as the blanks advance on cylinder 33, they will be traveling with their major axes normal to their direction of travel.

Figure 5:
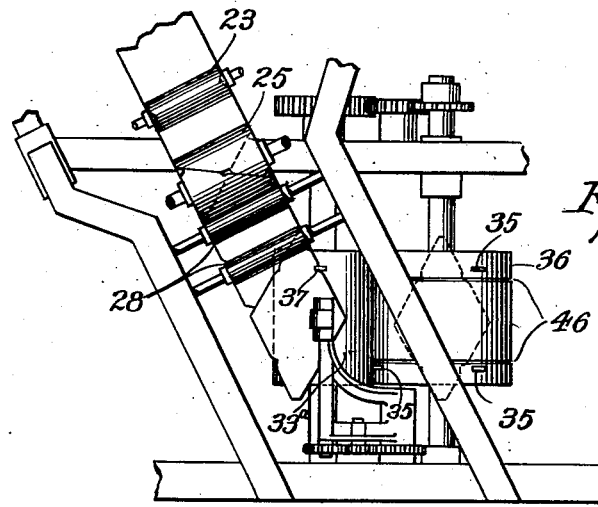
Fig. 5 shows the devices for delivering the blanks at an acute angle from the line of the web and with their major axis perpendicular to their subsequent direction of travel. This view corresponds with the diagrammatic view shown in Fig. 2.

In the embodiment shown in Fig. 5, and shown diagrammatically in Fig. 2, I use the blank handling or angular transfer device shown in the Smith Patent No. 1,118,515. The blanks are received from the propeller rolls and gripped by grippers 37 upon first transfer cylinder 33ª. This cylinder is disposed with its axis at an acute angle to the side of the web and this angle is such that the axis of the cylinder is parallel to the major axes of the rhomb shaped blanks in the web. By so disposing the cylinder, the blanks, when gripped thereon, will, during the rotation of the cylinder, advance with their major axes normal to their direction of travel. The first transfer cylinder 33ª is adapted to advance the blanks and deliver them to grippers 35 on second transfer cylinder 36.

Figure 6:
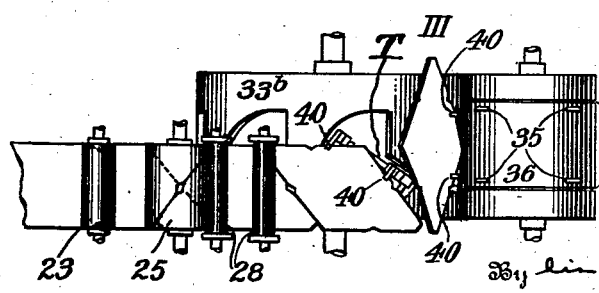
Fig. 6 shows devices for delivering the blanks in a direction parallel with the web and with their major axis perpendicular to their subsequent direction of travel. This view corresponds with Fig. 3 of the diagrammatic views.

In the embodiment shown in Fig. 6 and shown diagrammatically in Fig. 3, I use the blank handling device of the Stone Patent No. 1,123,617. In this device, the blank is received from propeller rolls 28 and is gripped by grippers 40 on blank turning devices T. The turning devices T are carried on blank transfer cylinder 33ᵇ, and during the advancement of this cylinder the turning devices are turned to deliver the blanks in the position shown at III in Figs. 6 and 3. In this position, the blanks are advancing with their major axes normal to their direction of travel. The blank turning devices deliver the blanks to grippers 35 on second blank transfer or receiving cylinder 36.

It will be understood that each of the three embodiments of blank handling devices shown can be utilized with the cutting mechanism shown in Fig. 7 and with the mechanism which performs the subsequent operations. This mechanism will now be described.

Referring particularly to Fig. 10, the dotted circle represents the first blank receiving or transfer cylinder designated as 33, 33ª and 33ᵇ in Figs. 4, 5 and 6, respectively. The blanks are transferred from this cylinder to cam operated grippers 35 on second blank transfer cylinder 36. Cylinder 36 rotates counter clockwise. Mounted adjacent thereto is a window cutter roll 42 which cutter roll carries the cutter knife 43 and a number of chip removing pins 44. See Fig. 11. This cutter in its rotation cuts the window aperture IV (see Figs. 1, 2, 3 in the blank), and in its further rotation is adapted to have the chip removed from the pins 44 by a suitable stripper. From the stripper, the chip drops upon a conveyer, which removes the chip to a suitable receptacle at the side of the machine. The blanks in their advancing movement then pass a creasing device 45 which coöperates with grooves 46 in roll 36. This creaser makes the creases V in the blanks and corresponds with the creaser 138 of the Smith Patent No. 1,118,515.

From cylinder 36 the blanks are delivered to cam operated grippers 47 upon third transfer roll 48ª. Upon this roll the blanks advance in a clockwise direction and pass under a rotary gummer 48, which takes gum from gum fountain 49 by the usual ductor rolls 50. The construction of the gummer is shown in Figs. 12 and 13. It comprises a flattened roll 51, having inner plates 52 bolted thereto. Around these plates is placed the gummer strip 48 of rubber or felt and around the gummer 48 is a metal band or strip 53, which is provided with bolts to secure it and clamp the gum strip securely to the inner plates 52. This construction rigidly holds the gumming strip 48 in position and permits the strip to be raised at any time by packing up between plates 52 and the flattened portions of the roll 51. The gummer roll is preferably mounted on a pivoted arm 54, which is adapted to be lifted by an eccentric strap and handle 55. In this way the gummer roll may be lifted from third transfer roll 48, when the machine is at rest. I also contemplate using a device to automatically lift the gummer when no blanks are passing through the machine. The mechanism for doing this is not illustrated as such devices are well known in the art. The gummer 48 is adapted to apply a thin border of gum about each window as shown at VI in Figs. 1, 2 and 3. After the blanks are gummed, they are advanced to the patch applying devices, which will now be described.

*Patch attaching devices.*

The roll of transparent patch paper 56 is suitably journaled upon the frame of the machine and is tensioned by a gravity brake 57. From the supply roll, the paper is led through patch feeding rolls 58 and 59, which are geared together to rotate in unison. The upper roll 58 is spring pressed into engagement with lower roll 59. In order that these rolls be given an intermittent forward rotation, I provide a feed mechanism as shown in Fig. 18. A ratchet 60 is secured to the end of roll 59 or to its shaft. Freely rotatable on this shaft is a segment 61, which has a pawl 62 engaging the ratchet 60. The segment 61 meshes with a segment 63, which is carried on the end of a pivoted bar 64. This bar is spring pressed upwardly by the spring shown, and is provided with a follower which coöperates with a three lobed cam 65, which is rotated by the shaft carrying third transfer cylinder 48. The above instrumentalities are adapted to advance a length of patch paper for each blank which is advanced on cylinder 48.

From the feeding rolls, the patch material is fed through the knife devices. These knife devices comprise stationary knife blade 66, and pivoted moving blade 67. The pivoted blade 67 is adapted to be given a periodic up and down movement by rock lever 68, which is spring pressed in one direction and moved in the opposite direction by a cam 69, which is adapted to rotate three revolutions to one revolution of the shaft carrying the roll 48. The above described knife devices sever the transparent strip into patches of suitable width to cover the windows in the blanks.

From the knife devices just described, the patch material is advanced over a guide, which is adapted to direct the patch material to the devices which individually grip the patches and apply them to the windows in the blanks. These devices comprise two rolls 76 and 77, which rotate in unison with transfer roll 48. The rolls 76 and 77 have portions of their periphery cut away, leaving high portions 78 and 79. With this construction, the patch material can be fed forward between rolls 76 and 77, and upon the high portions 78 and 79, coming into contact, the patch will be gripped and fed forward. This provides means for spacing the patches apart on the successive blanks on roll 48. In order to provide means for gripping the patch to roll 77, so that it will be carried by this roll into contact with the blank, I provide the roll with a number of suction holes 80, which connect with a duct 81 in shaft 82, carrying roll 77. See Fig. 14. The duct 81 leads through the shaft and connects with the interior of an air valve, which applies and cuts off the air suction to the suction holes 80 in roll 77. This air valve is shown in Figs. 15 and 16 and comprises a member 83, rotating in unison with shaft 82, which member has a duct 84 leading to the outer face thereof. Adjacent this face and forced into contact therewith by a spring 85 is a port plate 86, which through port 87 is adapted to connect duct 84 with duct 88, which leads to any desired means for producing air suction, as a pump (not shown). The port plate 86 also is provided with a port 89, which connects with a passage 90 leading to the atmosphere. This port and passage are adapted at the proper point in the revolution of member 83 to register with duct 84 and release the air suction at suction holes 80, which holds the patch to the cylinder or roll 77. The port member is carried on a squared shaft 91, which permits the port member to closely approach valve member 83, but at the same time prevents the rotation of the ported member.

The above instrumentalities are adapted to cause an air suction to be applied at the suction holes 80 just as the patch is gripped and advanced by the high spots of rolls 76 and 77. The leading edge of the patch is gripped by the air suction and the patch then follows the roll 77 in its counter-clockwise rotation until the patch is engaged by gum on the blank carried by roll 48. The air suction is then released, thus releasing the patch from roll 77 and permitting it to follow the blank. The high periphery 79 of roll 77 coöperates with the roll 48 to firmly press the patch into engagement with the blank and cause it to adhere to the gummed borders of the windows. The patched blanks are shown at VII in the diagrammatic views.

After the patches are applied to the blanks, the patched blanks are carried forward by roll 48 and delivered to cam operated grippers 163 on fourth transfer cylinder 156. This fourth transfer cylinder corresponds with the impression cylinder 20 of the Smith Patent No. 1,051,353, and is provided with suitable impression beds 210 which coöperate with corner card and stamp printing mechanism. The blanks as they are advanced on this cylinder are adapted to have corner cards printed thereon by coöperation with type on form cylinder 401 which cylinder is carried by a carrier 400 corresponding to carrier 30 of the Smith patent above referred to. For a description of the operation of the printing devices reference may be made to the said patent. After the corner card is printed on the blank, the cylinder 156 carries the blank into coöperation with stamp dies 222 carried by stamp form cylinder 220. The dies are adapted to receive ink from an ink fountain by the usual ductor rolls and the said dies 222 are adapted to coöperate with the impression beds 210 to emboss and print stamps on the blanks.

The blanks are then carried upwardly and delivered to folding beds 235 on folding cylinder 240. Associated with the folding beds are end clips 236, end folders 237 and bottom flap folders 241, which devices are suitably operated by followers as 243 coöperating with cams fixed to the frame of the machine. For further description of these folding devices reference may be had to the Smith Patents Nos. 1,051,353 and 1,118,515, it being understood that folding cylinder 240 corresponds with cylinder 170 of the last mentioned patent.

It will be understood that suitable gearing is provided for driving the various instrumentalities in harmony.

Starting with two webs of paper, one envelop paper and the other patch paper the above described machine is adapted to cut blanks, produce complete patched, folded, printed and stamped window envelops. The cutting of the paper is so carried out that there is a minimum of waste and the continuously operating character of the machine insures the production of window envelops at a low cost.

It is to be understood that my invention is not limited to the precise construction shown and described but what I claim as my invention is more particularly defined by the appended claims.

What I claim is:

1. In a machine for making window envelops from a continuous strip of paper, in combination, rotary cutter means and coacting rotary die rolls for severing the web into rhomb shaped blanks, said blanks having two sides parallel to the path of the web and two sides diagonal to the side of said web, said blank having its major axis at an angle to its line of travel as it is severed from the web, means for thereafter advancing the blanks with their major axes normal to their subsequent direction of travel, means for cutting oblong window apertures in the blanks said apertures extending parallel with the major axes of the blanks, means for gumming the aforesaid apertures, means for applying patches of transparent material over pre-cut window apertures and means for advancing the patched blanks to mechanism for performing subsequent operations thereon such as printing and folding.

2. In a machine for making window envelops from a continuous strip of paper, in combination, coacting rotary cutter and rotary die means for severing the web and forming said web into rhomb shaped blanks, said blanks having two sides parallel to the sides of the web and other sides diagonal to said sides whereby the major axes of the blanks are at an angle to the line of travel of the blanks as they are severed from the web, means for thereafter adjusting the blanks to a position in which their major axes are normal to their direction of travel, means for thereafter advancing the blanks with their axes normal to their direction of travel, means for cutting oblong window apertures in said blanks, said apertures extending parallel to the major axes of the blanks, means for gumming the blanks about the apertures and means for applying transparent patches in register with the gummed portions of the blank to cover the said apertures, and means for performing subsequent operations on the blanks.

3. In a machine for making window envelops from a continuous web of paper, in combination, coacting rotary cutters and rotary dies for cutting the said web into rhomb shaped envelop blanks, said blanks having their major axes at an angle to the line of travel of the web, means for advancing said blanks through mechanism for performing subsequent operations thereon, means adapted to receive the blanks as they come from the cutter devices and adapted to present the said blanks to said blank advancing means with the major axis of the said blanks normal to their direction of travel therein, means for cutting window apertures in the blanks, said apertures extending parallel to the major axes of the rhomb shaped blanks, means for gumming the said paper about said windows, means for applying and registering patches over the said windows, said patches being secured by the gum to the paper of the blanks; and means for performing subsequent operations on the blanks.

4. In a window envelop machine, in combination, means for continuously advancing a web of paper, a cutter means associated therewith and adapted to cut the said web into rhomb shaped envelop blanks, said blanks having their major axes at an angle to the sides of the web, means for continuously advancing the blanks as they come from the cutter devices and in the same relative position as in the web, a second blank advancing means, and means intermediate the first mentioned blank advancing means and said second mentioned blank advancing means adapted to receive blanks and to present the blanks with their major axes normal to their direction of travel in the second mentioned blank advancing means, means associated with the aforesaid means for cutting window apertures in the blanks, gumming the margins of the apertures and applying patches thereover, and means for delivering the patched blanks to a mechanism for completing the folding of the envelop.

5. In a window envelop machine, in combination, means for successively advancing a series of rhomb shaped envelop blanks, said blanks being advanced with their major axes at an angle to their line of travel; means for successively receiving said advancing blanks and advancing them and delivering them with their major axes normal to their subsequent direction of travel; means for successively cutting window apertures in the blanks; means for successively gumming the blanks; means for successively applying patches thereto; means for printing the said blanks and means for thereafter folding the blanks.

6. In a window envelop machine, in combination, means for successively advancing a series of rhomb shaped envelop blanks, said blanks being advanced with their major axes at an angle to their line of travel; means for successively receiving said advancing blanks and advancing them and delivering them with their major axes normal to their subsequent direction of travel; means for successively cutting window apertures in the blanks; means for successively gumming the blanks; means for successively applying patches thereto; means for printing and embossing stamps on the patched blanks and means for thereafter folding the blanks.

7. In a window envelop machine, in combination, means for successively advancing a series of rhomb shaped envelop blanks, said blanks being advanced with their major axes at an angle to their line of travel; means for successively receiving said advancing blanks and advancing them and delivering them with their major axes normal to their subsequent direction of travel; means for successively gumming the blanks; means for successively applying patches thereto; means for printing the said blanks; means for printing and embossing stamps on the blanks; and means for thereafter folding the blanks.

8. In a machine for making window envelops, in combination with a cutter means adapted to sever the web into a plurality of rhomb shaped blanks having their major axes angularly disposed with respect to their line of travel; blank advancing devices; means for receiving said blanks from the cutter means and for advancing and presenting said blanks to the aforesaid blank advancing devices with their major axes normal to their subsequent line of travel therein; a blank folding means; a cutter means, intermediate the web severing blank cutter means and the aforesaid folding means, for cutting window apertures in the blanks; a gummer, intermediate the window cutter means and the folding means, adapted to gum the margins of the window apertures; means, intermediate the gummer and the aforesaid folding means, for successively applying patches in registry over the gummed borders of the apertures, said patch applying means being adapted to firmly press the patch down upon the gummed blank.

9. In a window envelop machine, in combination, means for successively advancing a series of rhomb shaped envelop blanks, said blanks being advanced with their major axes at an angle to their line of travel; means for successively receiving the said advancing blanks and advancing them and delivering them with their major axes normal to their subsequent direction of travel; a cutter means for successively cutting window apertures in the blanks; a chip remover adapted to remove the cut chip from the blank and deliver the said chip to a chip conveyer; means for successively gumming the blanks; means for successively applying patches thereto; and means for subsequently performing further operations upon the patched blanks.

10. In a window envelop machine, in combination; a means for continuously advancing a series of rhomb shaped blanks; a means for continuously receiving the said blanks therefrom and for continuously advancing the said blanks and presenting them to subsequent mechanism with their major axes normal to their direction of travel therein; a blank receiving device adapted to receive blanks therefrom; a rotary window cutter associated therewith, adapted to cut windows in the said blanks; a rotary gummer adapted to gum the said blanks; a rotary patch bed adapted to receive patches thereon and to roll and press the said patches into engagement with the gummed blanks; means for timing the application of the patches to said rotary patch bed, whereby the patches are spaced apart and properly registered over the windows in the said blanks; and means for delivering the patched blanks to subsequent mechanism.

11. In a machine for making window envelops, in combination with cutter means adapted to sever a web into a plurality of rhomb shaped blanks having their major axes angularly disposed with respect to their line of travel; blank advancing devices; means for receiving said blanks from the cutter devices and for presenting the blanks to the aforesaid blank advancing devices with their major axes normal to their subsequent line of travel therein; a cutter means adapted to cut window apertures in the blanks; a gummer adapted to gum the margins of the window apertures; a patch supplying and applying device adapted to advance a length of patch paper from a supply roll, to sever the said paper into patches of proper size, and to thereafter firmly press the patch down upon the gummed blank and in registry with the window therein; and means for thereafter performing a series of subsequent operations on the patched blanks whereby a complete envelop is formed.

In testimony whereof I affix my signature in the presence of two subscribing witnesses.

WILLIAM H. BANZETT.

Witnesses:
 FELIX THOMAS,
 J. B. McGUIRE.